United States Patent
Bruggeman et al.

(10) Patent No.: US 11,207,832 B2
(45) Date of Patent: Dec. 28, 2021

(54) FEEDSTOCK LIQUEFIER REPLACEMENT IN ADDITIVE MANUFACTURING

(71) Applicant: BOND HIGH PERFORMANCE 3D TECHNOLOGY B.V., Enschede (NL)

(72) Inventors: Thomas Jonathan Bruggeman, Enschede (NL); Adrianus Bruggeman, Enschede (NL); Kevin Hendrik Jozef Voss, Enschede (NL); Marald Speelman, Enschede (NL); Klaas Groen, Enschede (NL); Johannes Hermannus Timmer Arends, Enschede (NL); Martijn Johannes Wolbers, Enschede (NL); Koendert Hendrik Kuit, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 0 days.

(21) Appl. No.: 16/955,161

(22) PCT Filed: Dec. 20, 2018

(86) PCT No.: PCT/EP2018/086109
§ 371 (c)(1),
(2) Date: Jun. 18, 2020

(87) PCT Pub. No.: WO2019/122082
PCT Pub. Date: Jun. 27, 2019

(65) Prior Publication Data
US 2020/0376760 A1    Dec. 3, 2020

(30) Foreign Application Priority Data
Dec. 21, 2017   (EP) ..................................... 17209683

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/321* (2017.08); *B29C 64/393* (2017.08);
(Continued)

(58) Field of Classification Search
CPC ... B29C 64/209; B29C 64/321; B29C 64/393; B33Y 30/00; B33Y 40/00; B33Y 50/02
See application file for complete search history.

(56) References Cited

U.S. PATENT DOCUMENTS

| 9,327,447 B2 | 5/2016 | Batchelder et al. | |
|---|---|---|---|
| 2012/0164263 A1* | 6/2012 | Pasquier | ................. B29C 49/48 425/541 |
| 2015/0096717 A1* | 4/2015 | Batchelder | ............ B29C 48/802 165/64 |

FOREIGN PATENT DOCUMENTS

| CN | 102481721 A | 5/2012 |
|---|---|---|
| CN | 103831974 A | 6/2014 |
| WO | 2017152142 A1 | 9/2017 |

OTHER PUBLICATIONS

Chinese Office Action dated Jan. 7, 2021 for family member Application No. 201880079074.5.

\* cited by examiner

*Primary Examiner* — Joseph S Del Sole
*Assistant Examiner* — John Robitaille
(74) *Attorney, Agent, or Firm* — Hudak, Shunk & Farine Co. LPA

(57) ABSTRACT

A printhead assembly having connection for connecting to a positioning system of an AM system, a feedstock liquefying unit having a nozzle for depositing liquefied AM feedstock (Continued)

onto at least one of a build plate and an object to be created. The feedstock liquefying unit has a supply opening and a supply channel from the supply opening to the nozzle. The printhead assembly has heat exchanging elements attached to the printhead assembly, arranged to establish a releasable clamping connection with the feedstock liquefying unit to accommodate the feedstock liquefying unit in the printhead assembly. The heat exchanging elements are actuatable to an open state, and a closed state. A system for additive manufacturing, including a build plate, a positioning system associated with at least one of the printhead assembly and the build plate, a feedstock liquefying unit storage, a controller arranged for controlling the positioning system for replacing the feedstock liquefying unit.

17 Claims, 11 Drawing Sheets

(51) Int. Cl.
*B33Y 40/00* (2020.01)
*B33Y 50/02* (2015.01)
*B29C 64/321* (2017.01)
*B29C 64/393* (2017.01)

(52) U.S. Cl.
CPC ............... *B33Y 30/00* (2014.12); *B33Y 40/00* (2014.12); *B33Y 50/02* (2014.12)

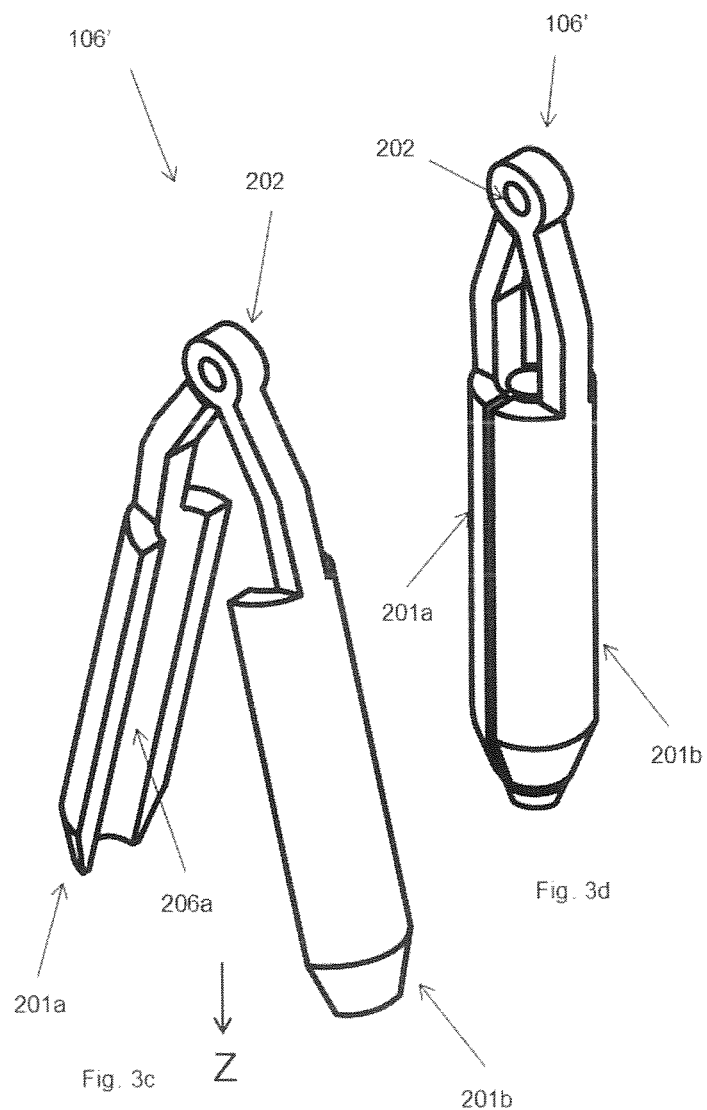

FEEDSTOCK LIQUEFIER REPLACEMENT IN ADDITIVE MANUFACTURING

FIELD OF THE INVENTION

The invention relates to a system for additive manufacturing. More specifically the invention relates to replacement of a feedstock liquefying unit in a system for additive manufacturing.

BACKGROUND OF THE INVENTION

In three-dimensional modeling, objects are formed by layering modeling material in a controlled manner such that a desired three-dimensional shaped object can be created. This way of forming objects can also be referred to as additive manufacturing. Very often for three-dimensional modeling a three-dimensional modeling printer is used. The printer has a three dimensionally moveable printhead which dispenses the modeling material, while the printhead is moved over previously deposited tracks of the modeling material.

The object to be printed can be placed on a build plate. The printhead is movable in a three-dimensional space relative to the object being modeled or printed. In some cases, the object is movable in one or more dimensions relative to the printhead. Various options are available for moving the build plate on which the object is modeled and the printhead relative to each other.

The motions of the printhead are controlled by a control system which controls a three dimensionally controllable positioning system to which the printhead is attached. By means of software a pattern of tracks can be generated, which pattern is used for moving the printhead and for depositing the tracks.

The object is created on a build plate in a reference location relative to the movable printhead. The modeling material can be fused with previously formed tracks. The three-dimensional modeling material can be fed in the printhead in the form of for example filament, granulate, rod, liquid, resin or a suspension.

The modeling material, further referred to as feedstock, is dispensed from the printhead through a feedstock liquefying unit and is deposited on the build plate in the form of tracks forming a layer of tracks, or when a previous layer of the object to be created has been deposited, on previously deposited tracks where it is allowed to solidify. The modeling material can be thermally or chemically or otherwise fused with the previously deposited tracks. The modeling material can be dispensed from the printhead and deposited on the previously deposited tracks and cured to solidify after the deposition.

The relative motion of the build plate and object to the printhead along tracks and simultaneous deposition of modeling material from the printhead allow the fused deposition modeled object to grow with each deposited track and gradually attains its desired shape.

The modeling material within the feed channel of the printhead may decay while printing. This may be due to for example impurities within the modeling material, or ingress of dust or other particles from the environment wherein the three-dimensional printer is located, or other sources. For fusible material which is melted prior to deposition by the feedstock liquefying unit of a printhead, in order for it to be printable, there is a risk of decomposition or disintegration if the material is kept at a high temperature near the melting temperature too long.

This may give rise to formation of solid particles of disintegrated modeling material. In depositing for example curable resins, also contaminants within the modeling material, and/or dead spots within the feed channel may eventually give rise to formation of solid particles. This applies especially for the feedstock liquefying unit which is usually kept at the highest temperature within the printhead. Near the feed channel wall, especially near the feedstock liquefying unit, the modeling material flow rate is lowest. As a consequence, undesired solidification and disintegration is usually initiated in this region.

While depositing the modeling material, debris or solid particles in the feed channel or nozzle of the feedstock liquefying unit may cause clogging and can lead to reflow of material inside the feedstock liquefying unit, causing jamming of the feedstock liquefying unit.

Alternatively, the nozzle opening of the feedstock liquefying unit can wear out and dilate, resulting in a larger width of printed tracks and less accurate part dimensions. Moreover, the pressure of the extruded material from the nozzle will be higher, potentially resulting in over-extrusion of the layer being deposited on the previous layer. This may result in excessive forces between the object and the printhead and in a rough surface of the created object due to overflow of the modeling material. The overflow of modeling material may further lead to debris or residue on the outside of the nozzle tip of the printhead which may come off the nozzle tip and fuse with the object being printed and cause potential loss of the object.

Furthermore, when printing objects, different colors or different materials may be used. Moreover, different feedstock deposition modeling methods may apply, involving for example different nozzle diameters or different feedstock supply tubes for different materials depending on the requirements in time.

Thus, it is desirable to exchange the feedstock liquefying unit depending on the feedstock deposition modeling requirements for maintenance, material choice, feedstock deposition method etcetera.

In the art feedstock liquefying units have been integrated with the heat exchanging means to provide heat transfer between heating elements of the heat exchanging means. This is necessary to prevent hotspots within the feedstock liquefying unit. To exchange the feedstock liquefying unit, the entire printhead including heat exchanging means and feedstock liquefying unit needs to be exchanged. As the heat exchanging means is usually powered electrically, specialized electrical connections are required to connect the heat exchanging means of the exchanged printhead.

Alternatively, the nozzle or nozzle tip of the feedstock liquefying unit can be exchangeable. In the art this requires manual intervention such as unscrewing a current feedstock liquefying unit to be exchanged from the printhead, and screwing in a replacement feedstock liquefying unit or nozzle or nozzle tip into the printhead. This procedure however causes interruption of the 3D modeling process wherein the printhead needs to be cooled down. The interruption and subsequent cooling down may lead to abortion of an ongoing modeling job and subsequent loss of resources and time.

Exchanged or spare printheads can be stored in a printhead holder. As printheads may be bulky, considerably large sized and relatively expensive holders or cassettes are needed for storing the printheads.

SUMMARY OF THE INVENTION

It is therefore an object of the invention to provide feedstock liquefying unit exchange which overcomes the above stated problems and disadvantages.

The object is achieved in a printhead assembly for a system for additive manufacturing (AM). The printhead assembly comprises connection means for connecting the printhead assembly to a positioning system of an AM system, The printhead assembly further comprises heat exchanging means attached to the printhead assembly, wherein the heat exchanging means are configured and arranged to establish a releasable clamping connection with a feedstock liquefying unit that is configured to liquefy AM feedstock to accommodate the feedstock liquefying unit in the printhead assembly, wherein the heat exchanging means are actuatable for bringing the heat exchanging means to an open state, to allow at least one of disposal of the feedstock liquefying unit and acquisition of a replacement feedstock liquefying unit, and for bringing the heat exchanging means to a closed state, to hold the feedstock liquefying unit.

The feedstock liquefying unit for liquefying AM feedstock, may comprise a nozzle for depositing liquefied AM feedstock onto at least one of a build plate and an object to be created. The feedstock liquefying unit has a supply opening and a supply channel from the supply opening to the nozzle.

The current feedstock liquefying unit may be replaced by another feedstock liquefying unit having the same or a different feedstock. The replacement feedstock liquefying unit may further have different properties such as nozzle diameter. However, the outer shape profile and dimensions must correspond to the inner shape profile of the heat exchanging means wherein it is to be placed tight fittingly to ensure adequate heat transfer from the heat exchanging means to the feedstock liquefying unit.

In an embodiment, the heat exchanging means comprises a first heat exchanging section and at least one of a second heat exchanging section and a support structure, wherein the support structure is associated with the printhead assembly.

The first heat exchanging section and at least one of the second heat exchanging section and the support structure are movable relative to one another. At least one of the first heat exchanging section, the second heat exchanging section and the support structure is actuatable to bring the heat exchanging means to an open state, to allow at least one of disposal of the feedstock liquefying unit and acquisition of the replacement feedstock liquefying unit. Furthermore, at least one of the first heat exchanging section, the second heat exchanging section and the support structure is actuatable to bring the heat exchanging means to a closed state, to hold the feedstock liquefying unit.

It is noted that in the context of this invention, a closed state is to be construed as a state in which the heat exchanging means and the feedstock liquefying unit are arranged in a clamping contact with each other. Furthermore, an open state is to be construed as a state in which there is no clamping contact between the heat exchanging means and the feedstock liquefying unit. In an open state the heat exchanging sections can be one of fully opened and slightly opened. In the latter case the heat exchanging means and the feedstock liquefying unit are arranged in a sliding abutting contact during exchange of the feedstock liquefying unit.

In the open state the feedstock liquefying unit can be extracted and replaced by a replacement feedstock liquefying unit. In the closed state, wherein the feedstock liquefying unit is held by the at least one first heat exchanging section and at least one of the second heat exchanging section and the support structure, the feedstock liquefying unit is heatable by the heat exchanging means and held tightly to achieve the performance of the 3D printing using the positioning system for which the system was designed.

In an embodiment, at least one of the first heat exchanging section, the second heat exchanging section and the support structure is associated with the printhead assembly using a pivotal hinge. This allows the at least one first heat exchanging section to hinge to an open position. The pivot axis may be arranged in an orientation perpendicular to the X,Y plane of the positioning system allowing the feedstock liquefying unit to be replaced using the positioning system with a movement in that X,Y plane.

In an embodiment, at least one of the first heat exchanging section, the second heat exchanging section and the support structure is associated with the printhead assembly using a slidable arrangement. This allows an alternative way of releasing the feedstock liquefying unit.

In an embodiment, the printhead assembly further comprises a reference element for providing a reference position to the at least one first heat exchanging section. The feedstock liquefying unit needs to be accurately aligned with the printhead assembly to allow accurate positioning of the feedstock liquefying unit nozzle, and thereby accurate modeling of the object to be created.

In an embodiment, the heat exchanging means is provided with a recess that is arranged to accommodate a feedstock liquefying unit, the heat exchanging means being arranged to release and acquire the feedstock liquefying unit in at least one of a direction transverse to an axial center line of the recess, i.e. in an X,Y plane that is parallel to the build plate, and in a direction parallel to the axial center line of the recess, i.e. in a direction towards or away from the build plate.

In an embodiment, the at least one of the first heat exchanging section and the second heat exchanging section and the support structure is provided with at least one heat conductive element.

In an embodiment, said at least the one heat conductive element has a recessed shape corresponding to an outer circumference of the feedstock liquefying unit for close fittingly accommodating a feedstock liquefying unit.

In an embodiment, at least one of the first heat exchanging section, the second heat exchanging section and the support structure is provided with first actuating means, and wherein the first actuating means are arranged to cooperate with a second actuating means of a feedstock liquefying unit storage and a positioning system of an AM system.

This allows the heat exchanging means to assume the open state upon engagement of the first actuating means and the second actuating means. The heat exchanging means assumes the closed state upon disengagement of the first actuating means and the second actuating means. The actuating energy that is required for changing the heat exchanging means between the open state and the closed state can be provided by at least one of the feedstock liquefying unit storage and the positioning system.

In an embodiment, the printhead assembly further comprises a feedstock liquefying unit, wherein said feedstock liquefying unit comprises a nozzle for depositing liquefied AM feedstock onto at least one of a build plate and an object to be created, the feedstock liquefying unit having a supply opening and a supply channel from the supply opening to the nozzle.

This allows the printhead assembly to be operational in an AM system.

In an embodiment, the feedstock liquefying unit comprises a thermally conductive tube which is attached to the nozzle, wherein the supply channel is accommodated within the thermally conductive tube, and the supply opening is formed by an end part of the thermally conductive tube that is arranged opposite of the nozzle.

In an embodiment, the thermally conductive tube is provided with at least one concentric heat conductive section.

This allows optimal heat transfer between said heat conductive element and said liquefying unit via the heat conductive section. When multiple concentric heat conductive sections are used in combination with a heat isolating section therebetween, different temperature zones within the liquefying unit can be created.

The object is further achieved in a system for additive manufacturing (AM).

The system for additive manufacturing, comprises a build plate for positioning an object to be created, and at least one printhead assembly for fused deposition modeling. The printhead assembly comprises connecting means for connecting to a positioning system, heat exchanging means. The system further comprises a feedstock liquefying unit accommodated in said at least printhead assembly for liquefying AM feedstock.

The feedstock liquefying unit comprises a nozzle for depositing liquefied AM feedstock onto at least one of the build plate and the object to be created.

The system further comprises feedstock supply means, arranged for feeding the feedstock into the feedstock liquefying unit.

The system further comprises a positioning system associated with at least one of the printhead assembly and the build plate, arranged for relative spatial positioning of the printhead assembly and the build plate.

The system further comprises a feedstock liquefying unit storage, comprising holding means for accommodating at least one feedstock liquefying unit, and a controller arranged for controlling the positioning system for disposing the feedstock liquefying unit in a feedstock liquefying unit storage, and for controlling the positioning system for acquiring a replacement feedstock liquefying unit from the feedstock liquefying unit storage.

The heat exchanging means is configured and arranged to establish a releasable clamping connection with the feedstock liquefying unit to accommodate the feedstock liquefying unit in the printhead assembly. This configuration and arrangement of the heat exchanging means allows the feedstock liquefying unit to be replaced by a feedstock liquefying unit stored within the feedstock liquefying unit storage, while keeping the heat exchanging means in place. The heat exchanging means remains connected to its energy source for heating the feedstock liquefying unit. The control unit controls the positioning means for exchanging the feedstock liquefying unit.

The current feedstock liquefying unit may be replaced by another feedstock liquefying unit having the same or a different feedstock. The replacement feedstock liquefying unit may further have different properties such as nozzle diameter. However, the outer shape profile and dimensions must correspond to the inner shape profile of the heat exchanging means wherein it is to be placed tight fittingly to ensure adequate heat transfer from the heat exchanging means to the feedstock liquefying unit.

In an embodiment, the heat exchanging means comprises a first heat exchanging section and at least one of a second heat exchanging section and a support structure, wherein the support structure is associated with the printhead assembly.

The first heat exchanging section and at least one of the second heat exchanging section and the support structure are movable relative to one another. At least one of the first heat exchanging section, the second heat exchanging section and the support structure is actuatable to bring the heat exchanging means to an open state, to allow at least one of disposal of the feedstock liquefying unit and acquisition of the replacement feedstock liquefying unit. Furthermore, at least one of the first heat exchanging section, the second heat exchanging section and the support structure is actuatable to bring the heat exchanging means to a closed state, to hold the feedstock liquefying unit.

It is noted that in the context of this invention, a closed state is to be construed as a state in which the heat exchanging means and the feedstock liquefying unit are arranged in a clamping contact with each other. Furthermore, an open state is to be construed as a state in which there is no clamping contact between the heat exchanging means and the feedstock liquefying unit. In an open state the heat exchanging sections can be one of fully opened and slightly opened. In the latter case the heat exchanging means and the feedstock liquefying unit are arranged in a sliding abutting contact during exchange of the feedstock liquefying unit.

In the open state the feedstock liquefying unit can be extracted and replaced by a replacement feedstock liquefying unit. In the closed state, wherein the feedstock liquefying unit is held by the at least one first heat exchanging section and at least one of the second heat exchanging section and the support structure, the feedstock liquefying unit is heatable by the heat exchanging means and held tightly to achieve the performance of the 3D printing using the positioning system for which the system was designed.

In an embodiment, at least one of the first heat exchanging section, the second heat exchanging section and the support structure is associated with the printhead assembly using a pivotal hinge. This allows the at least one first heat exchanging section to hinge to an open position. The pivot axis may be arranged in an orientation perpendicular to the X,Y plane of the positioning system allowing the feedstock liquefying unit to be replaced using the positioning system with a movement in that X,Y plane.

In an embodiment, at least one of the first heat exchanging section, the second heat exchanging section and the support structure is associated with the printhead assembly using a slidable arrangement. This allows an alternative way of releasing the feedstock liquefying unit.

In an embodiment, the printhead assembly further comprises a reference element for providing a reference position to the at least one first heat exchanging section. The feedstock liquefying unit needs to be accurately aligned with the printhead assembly to allow accurate positioning of the feedstock liquefying unit nozzle, and thereby accurate modeling of the object to be created.

In an embodiment, the feedstock liquefying unit storage is provided with first actuating means, and at least one of the first heat exchanging section, the second heat exchanging section and the support structure is provided with second actuating means, and wherein the first actuating means are arranged to cooperate with the second actuating means.

This allows the heat exchanging means to assume the open state upon engagement of the first actuating means and the second actuating means. The heat exchanging means assumes the closed state upon disengagement of the first actuating means and the second actuating means. The actuating energy that is required for changing the heat exchanging means between the open state and the closed state can be provided by at least one of the feedstock liquefying unit storage and the positioning system.

In an embodiment, the feedstock liquefying unit storage is provided with at least one docking position for accommodating the feedstock liquefying unit. This allows the feedstock liquefying unit to be retained in the feedstock liquefying unit storage.

In an embodiment, the controller that is arranged to control the positioning system for disposing the feedstock liquefying unit in the feedstock liquefying unit storage is configured to: control the positioning system for moving the printhead assembly to an unoccupied docking position, enable engagement of the second actuating means and the first actuating means to move the heat exchanging means to the open state, and dispose the feedstock liquefying unit in the unoccupied docking position.

This allows the current feedstock liquefying unit which may need maintenance to be removed from the printhead assembly, i.e. from the heat exchanging means.

In use, the feedstock liquefying unit storage may be provided with at least one occupied docking position, each occupied docking position being configured and arranged to accommodate one replacement feedstock liquefying unit.

In an embodiment, the controller that is arranged to control the positioning system for acquiring a replacement feedstock liquefying unit from the feedstock liquefying unit storage is configured to control the positioning system for moving the printhead to an occupied docking position, enable engagement of the second actuating means and the first actuating means to move the heat exchanging means to an open state, and to envelop the replacement feedstock liquefying unit in the occupied docking position, control the positioning system for retracting the printhead from the occupied docking position, and before retracting the printhead from the occupied docking position, enable engagement of the second actuating means and the first actuating means to move the heat exchanging means to the closed state.

This allows a replacement feedstock liquefying unit to be collected and placed in the heat exchanging means.

In an embodiment, the feedstock liquefying unit is provided with a supply opening and a supply channel from the supply opening to the nozzle.

This allows feedstock from the feedstock supply means to pass through the feedstock liquefying unit. As the feedstock liquefying unit is heatable by the heat exchanging means, the feedstock can be heated while passing through the supply channel.

In an embodiment, the feedstock supply means is connected to the supply opening of the feedstock liquefying unit.

This is particularly advantageous for feedstock in filament form which may be supplied via a supply tube. The supply tube may be connected to the supply opening to allow the filament to pass through the supply tube to the feedstock liquefying unit for deposition after being melted within the feedstock liquefying unit.

In an embodiment, the feedstock supply means are connected to the printhead assembly, and wherein the feedstock supply means further comprise a detachable passage for detachably connecting the feedstock supply means to the feedstock liquefying unit. The detachable passage can be connected to a feedstock supply opening of the feedstock liquefying unit.

This allows feeding the feedstock into the feedstock liquefying unit supply channel when the feedstock liquefying unit is connected to the printhead assembly. When the feedstock liquefying unit is replaced, the feedstock supply means can remain in place. This may apply to feeding feedstock to the feedstock liquefying unit and also to feeding feedstock rods to the feedstock liquefying unit.

In an embodiment, the heat exchanging means is provided with a recess that is arranged to accommodate the feedstock liquefying unit, the heat exchanging means being arranged to release and acquire the feedstock liquefying unit in at least one of a direction transverse to an axial center line of the recess, i.e. in an X,Y plane that is parallel to the build plate, and in a direction parallel to the axial center line of the recess, i.e. in a direction towards or away from the build plate.

In an embodiment, the feedstock liquefying unit comprises a thermally conductive tube attached to the nozzle. The supply channel is accommodated within the thermally conductive tube, and the supply opening is formed by an end part of the thermally conductive tube that is arranged opposite of the nozzle. This allows heat transfer from the heat exchanging means into the supply channel wherein the feedstock material can be heated.

In an embodiment, the thermally conductive tube is provided with at least one concentric heat conductive section, and wherein at least the first heat exchanging section is provided with at least one heat conductive element, the heat conductive element having a recessed shape corresponding to an outer circumference of the at least one concentric heat conductive section for close fittingly accommodating the feedstock liquefying unit.

The heat conductive sections of the feedstock liquefying unit can be interspersed with grooves, and the heat conductive elements of the heat exchanging section can be mutually thermally insulated.

This allows temperature zones to be created each having an independently controllable temperature, each zone having an optimal heat transfer between the heat exchanging means and the feedstock liquefying unit, whereby the heat conductive sections ensure uniform distribution of the heat from the heat exchanging sections, while thermal crosstalk is prevented between at least one of the heat conductive elements, the heat conductive sections and the heat exchanging sections of different temperature zones. In this way feedstock within the feedstock liquefying unit can be heated in stages while hot spots are prevented.

BRIEF DESCRIPTION OF THE DRAWINGS

The invention will be further elucidated in the drawings as set out below.

FIG. 3c shows an alternative configuration of a heat exchanging means in an open state.

FIG. 3d shows the heat exchanging means of FIG. 3c in a closed state.

DETAILED DESCRIPTION OF EMBODIMENTS

The invention will be further elucidated in exemplary embodiments as described below.

Figure 1:
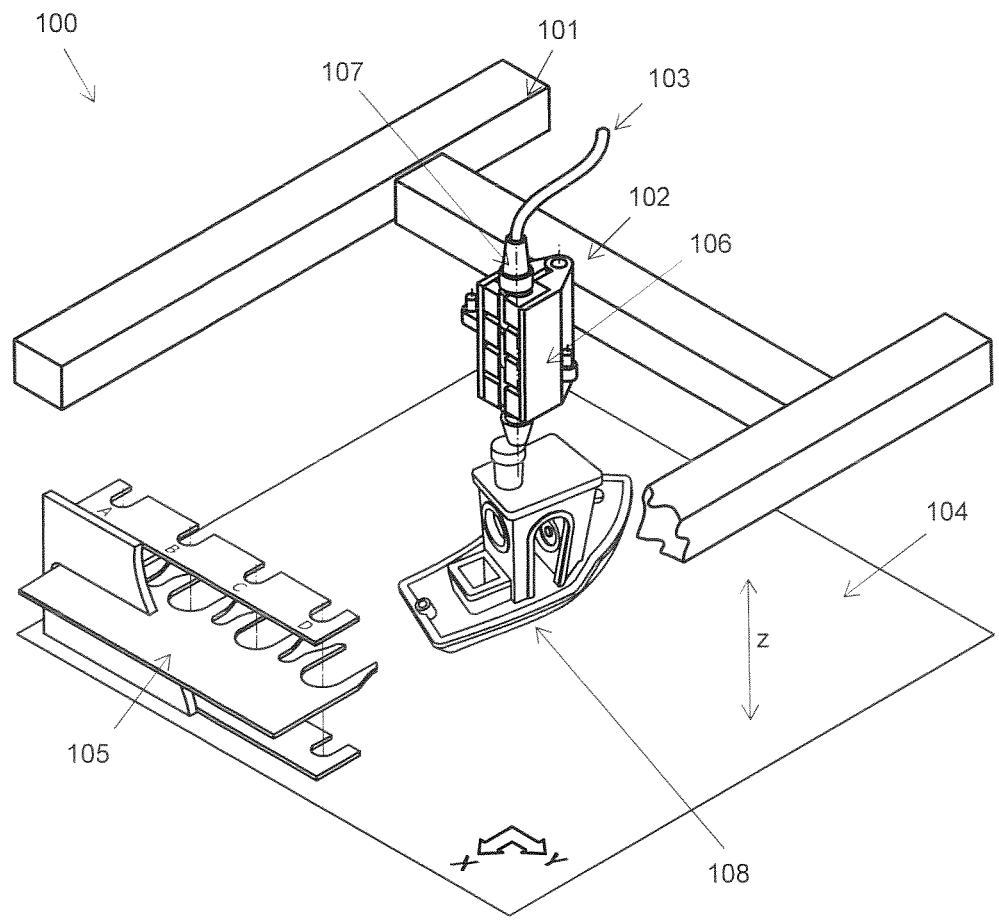
FIG. 1 shows an isometric schematic view of an additive manufacturing system according to an embodiment of the invention.

In the isometric schematic view of FIG. 1 of an additive manufacturing system 100, a build plate 104 is shown that supports an object 108 to be created. A positioning system 101, shown as a gantry has a printhead 102 attached thereon. Various alternatives may be envisioned for the positioning system which is arranged to provide horizontal (X-Y) movement and vertical (Z) movement of the printhead 102 relative to the build plate 104 and the object 108 to be created. In alternative embodiments, the object 108 and/or the build plate 104 may be moved relative to the printhead 102. In another alternative both printhead 102 and object 108 and/or build plate 104 may be moved relative to one another.

The positioning system 101 can be provided with drives which are controllable by a control system which can be arranged for translating an electronic three-dimensional model of the object to be created into instructions for movements of the printhead.

The printhead 102 can be provided with a feedstock liquefying unit 107 which obtains additive manufacturing (AM) feedstock from a feedstock supply 103. The feedstock liquefying unit 107 can be removably placed within a heat exchanging means 106 to allow the feedstock liquefying unit 107 to be removed and replaced by a replacement feedstock liquefying unit. In most cases, the heat exchanging means 106 is arranged to transfer heat to the feedstock liquefying unit 107 which allows feedstock within the feedstock liquefying unit 107 to be melted. The heat exchanging means 106 may further be arranged for at least partially cooling the feedstock liquefying unit 107. The heat exchanging device 106 may further be subdivided in temperature zones corresponding to the heat exchanging elements 204a, 204b of the heat exchanging sections 201a, 201b, allowing feedstock material within the feedstock liquefying unit 107 to be heated in stages. For this purpose, one or more zones of the heat exchanging means 106 may be arranged for cooling a corresponding part of the feedstock liquefying unit 107.

The feedstock is pushed by a drive (not shown in FIG. 1) into the feedstock liquefying unit 107. The drive is controllable by the control unit to allow a controlled flow of molten feedstock in coordination with the printhead movements relative to the object 108.

The pressure exerted on the feedstock by the drive allows the molten feedstock to be deposited via an exit opening, i.e. nozzle of the feedstock liquefying unit 107 on at least one of the build plate 104 and the object 108 to be created, where it is cooled down and where it solidifies.

The feedstock liquefying unit 107 may be deposited in a feedstock liquefier unit storage 105. A previously stored replacement feedstock liquefying unit 107 may be retrieved from the feedstock liquefier unit storage 105.

Figure 2:
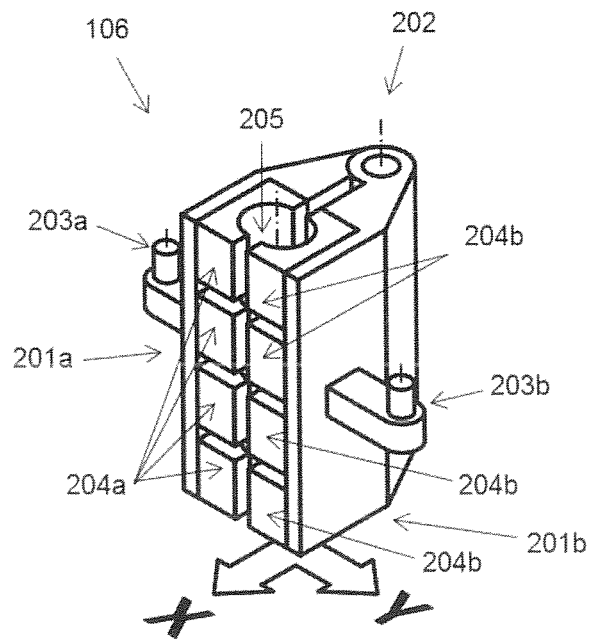
FIG. 2 shows an isometric view of a heat exchanging means according to an embodiment of the invention

In FIG. 2 an exemplary embodiment of the heat exchanging device 106 is shown.

The heat exchanging means 106 comprises two heat exchanging sections 201a, 201b which may be electrically heated using electrical resistors incorporated within the heat exchanging sections 201a, 201b. In this example, the heat exchanging means 106 further has heat conductive elements 204a, 204b connected to the respective heat exchanging sections 201a, 201b. The inner surfaces 206a, 206b of the heat conductive elements 204a, 204b are curved, thereby creating a recess 205 to allow a feedstock liquefying unit 107 to be clamped close fittingly between the sections 201a, 201b. The heat conductive elements 204a, 204b are thermally insulated from each other and from the respective heat exchanging sections 201a, 201b with which they are associated. In this way thermal crosstalk can be prevented.

In this example, the heat exchanging sections 201a, 201b are hingeably connected via hinge 202. The hinge 202 may comprise a hinge axle which at one end may be connected to a printhead sub frame (not shown) for connecting the printhead 102 to the positioning system 101. In this embodiment the hinge axle of hinge 202 is directed parallel to an axial center line of the recess 205. However, in another exemplary, non-limiting embodiment the hinge axle of hinge 202 can be directed transverse to the axial center line of the recess 205. The latter configuration will be elucidated further in relation to FIGS. 3c and 3d. Various alternatives are available to the skilled person for attaching the heat exchanging means to the printhead 102 and ultimately to the positioning system 101. The heat exchanging sections 201a, 201b may for example be independently hingeably mounted to the printhead sub frame, each having an individual pivot axis. The heat exchanging sections 201a, 201b may further be provided with a toothed cam each, which cams interlock, to obtain reciprocal motion of the heat exchanging sections 201a, 201b.

As an alternative to hingeable heat exchanging sections 201a, 201b, the heat exchanging sections 201a, 201b may be resiliently movable or resiliently mounted to the printhead assembly, to enable resilient or elastic separation of the sections to gain access to the liquefier unit.

The heat exchanging sections 201a, 201b may be provided with at least one of a heat supply and a heat sink for supplying or sinking heat to and from the liquefying unit 107. The heat supply may for example be an electric resistor. The heat sink may for example be provided by cooling fluid supply which may be admitted to the heat controlling section by means of a fluid channel. The cooling fluid may be a cold gas, e.g. cold air, or a cold liquid. The heat exchanging sections 201a, 201b may further be provided with a temperature sensor connected to the control unit for controlling a temperature of the liquefying unit 107.

The heat exchanging sections 201a, 201b are provided with engagement points 203a, 203b respectively, by which the heat exchanging sections may be operated to move the heat exchanging means between an open and a closed state for respectively releasing or receiving and holding the feedstock liquefying unit 107.

It is noted that in the context of this invention, a closed state is to be construed as a state in which the heat exchanging means 106 and the feedstock liquefying unit 107 are arranged in a clamping contact with each other. Furthermore, an open state is to be construed as a state in which there is no clamping contact between the heat exchanging means 106 and the feedstock liquefying unit 107. In an open state the heat exchanging sections 201a, 201b can be one of fully opened and slightly opened. In the latter case the heat exchanging means 106 and the feedstock liquefying unit 107 are arranged in a sliding abutting contact during exchange of the feedstock liquefying unit.

The engagement points 203a, 203b may be actuated by a drive located at the printhead 102. In the exemplary embodiment as described below, the engagement points 203a, 203b are actuated by protrusions of the feedstock liquefying unit storage 105 in cooperation with movements of the printhead 102 performed by the positioning system 101, thereby making a dedicated drive on the printhead superfluous.

It will be clear that various alternatives are available for separating and closing the two heat exchanging sections to allow release and acquisition of a feedstock liquefying unit. In the example described above, the two section 201a, 201b are movable. It is also possible to have one section fixed to the printhead sub frame and the other heat exchanging section movable. Furthermore, it is conceivable that there is only one heat exchanging section cooperating with a support structure, having an inner surface profile corresponding to a feedstock liquefying unit outer surface profile, connected to the printhead sub frame. In the latter case one heat exchanging section or both the heat exchanging sections and the support structure may be moveable relative to each other. Moreover, the engagement points 203a, 203b are examples of actuating points for the heat exchanging sections. Various alternatives for the actuating points such as notches, lugs or levers or any other actuating means may be contemplated. The actuating points may be driven by a dedicated drive.

Figure 3A:
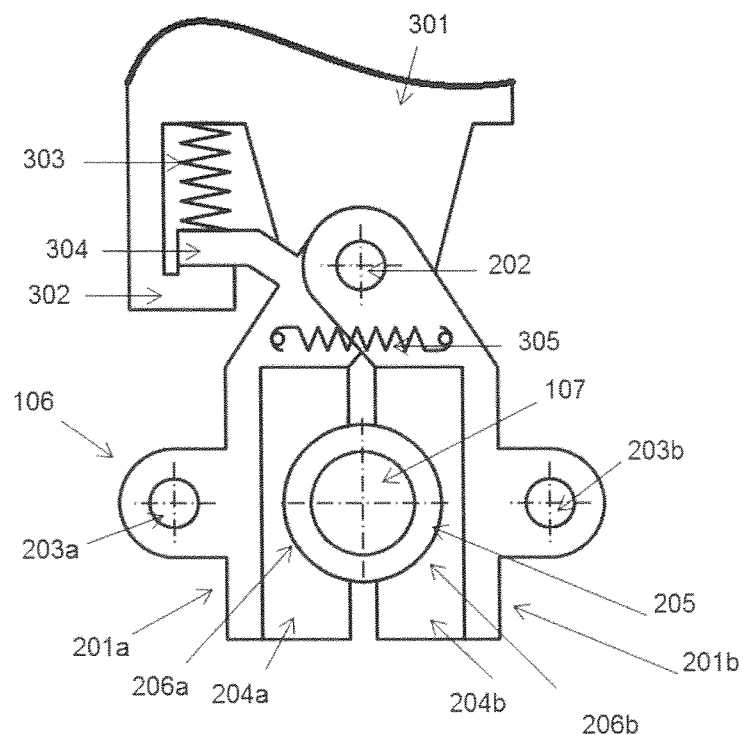
FIG. 3a shows a cross section of a heat exchanging means according to an embodiment of the invention in a closed state.

In FIG. 3a a cross section of the heat exchanging means 106 is shown having a clamp shape, in a closed state having a feedstock liquefying unit 107 in its holding recess 205. In FIG. 3a a printhead sub frame 301 is shown having the hinge 202 mounted thereon. Heat exchanging section 201a and heat exchanging section 201b are hingeably movable relative to one another via the hinge 202. The heat exchanging section 201a as shown in FIG. 3a has a lever 304 which rests against a reference point 302 of the printhead sub frame 301 using a spring 303, thereby preventing rotation of the heat exchanging means 106. This allows the heat exchanging section 201a to be pivotable relative to the sub frame 301 as well. The reference point 302 provides alignment of the heat exchanging sections 201a and 201b relative to the printhead sub frame 301, thereby accurately positioning of the feedstock liquefying unit 107. The heat exchanging sections 201a, 201b are closable by means of spring 305, thereby clamping the feedstock liquefying unit 107.

Figure 3B:
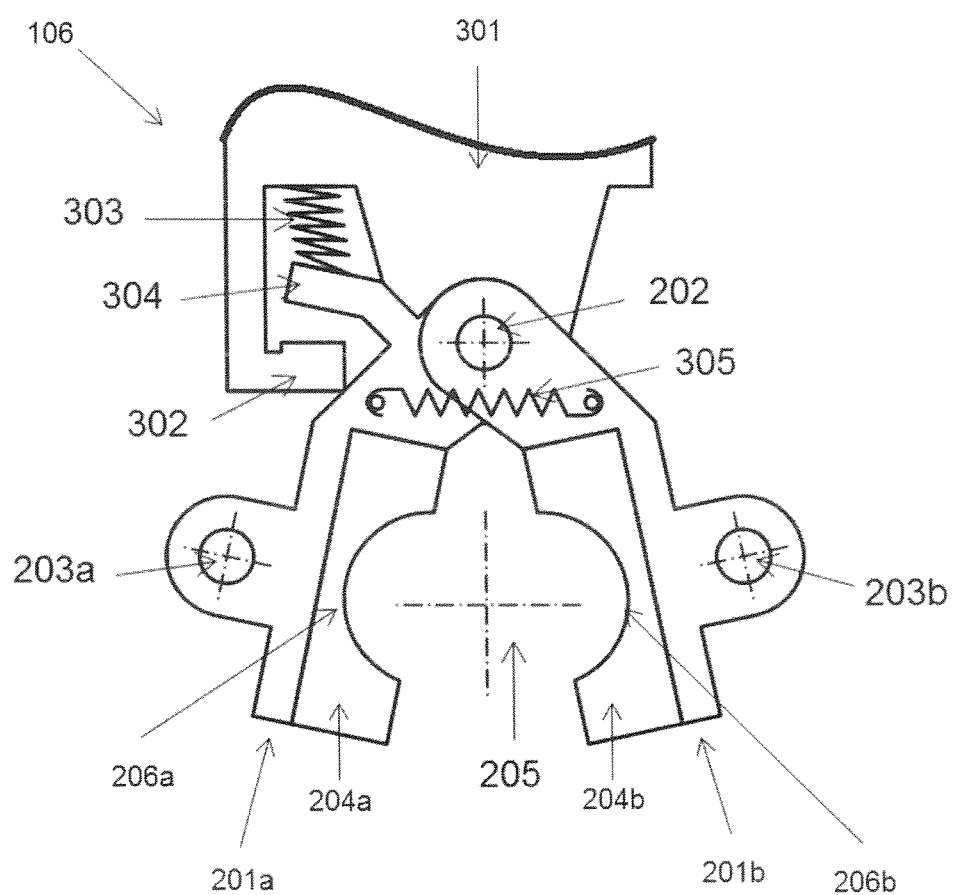
FIG. 3b shows a cross section of the heat exchanging means of FIG. 3a according to an embodiment of the invention in an open state.

In FIG. 3b, the heat exchanging means 106 is shown in an open state having a feedstock liquefying unit released from its holding recess 205. In FIG. 3b, the heat exchanging section 201a is out of alignment as the lever 304 is moved away from the reference point 302. This open state can be used either for releasing the feedstock liquefying unit and depositing the feedstock liquefying unit in the feedstock liquefying unit storage 105, or for obtaining a replacement feedstock liquefying unit from the feedstock liquefying unit storage 105. In this open state spring 303 is compressed, allowing the heat exchanging means 106 to return to its original closed position after releasing the heat exchanging sections 201a, 201b, wherein lever 304 rests against reference point 302, as shown in FIG. 3a.

In the examples above, while separating the heat exchanging sections 201a, 201b, a liquefying unit 107 can be releasable and insertable in recess 205 of the heat exchanging means 106 in an X,Y plane parallel to a ground plane of the printhead, e.g. the build plate.

Alternatively, the liquefying unit 107 can be releasable and insertable in recess 205 of the heat exchanging means 106 in a direction parallel to an axial center line of the recess 205, i.e. in a Z-direction transverse to the X,Y plane parallel to the build plate 104.

In FIG. 3c an alternative configuration is shown of a heat exchanging means 106' in an open state wherein the heat exchanging sections 201a, 201b are interconnected with hinge 202 to allow the release and insertion of a feedstock liquefying unit 107 in the Z-direction as described. The heat exchanging sections 201a, 201b have a curved inner surface to form the recess 205 for accommodating the feedstock liquefying unit 107.

FIG. 3d shows the heat exchanging means 106' of FIG. 3c in a closed state, wherein the heat exchanging sections 201a, 201b are adjacently positioned, with the hinge 202 as pivotal axis.

It will be clear to the skilled person that likewise means can be provided as in FIGS. 3a and 3b to actuate the heat exchanging sections 201a, 201b to bring them in an open state or in a closed state.

FIGS. 3e-3i show another alternative embodiment of the heat exchanging means 106". According to this embodiment the moveable heat exchanging sections 201a, 201b or support structure can be translatably arranged relative to each other as is shown in FIGS. 3e-3i. The heat exchanging sections 201a, 201b or support structure may be slidably mounted to the printhead assembly sub frame. For the sake of clarity, other parts of the heat exchanging means 106" are not shown in FIGS. 3e-3i.

The heat exchanging sections 201a, 201b or support structure can be slidably arranged in one or more slots and or guides in the printhead assembly sub frame. The heat exchanging sections 201a, 201b or support structure can be actuated similarly to the heat exchanging sections 201a, 201b or support structure in FIGS. 3a, 3b.

Figures 3E, 3F, 3G, 3H:
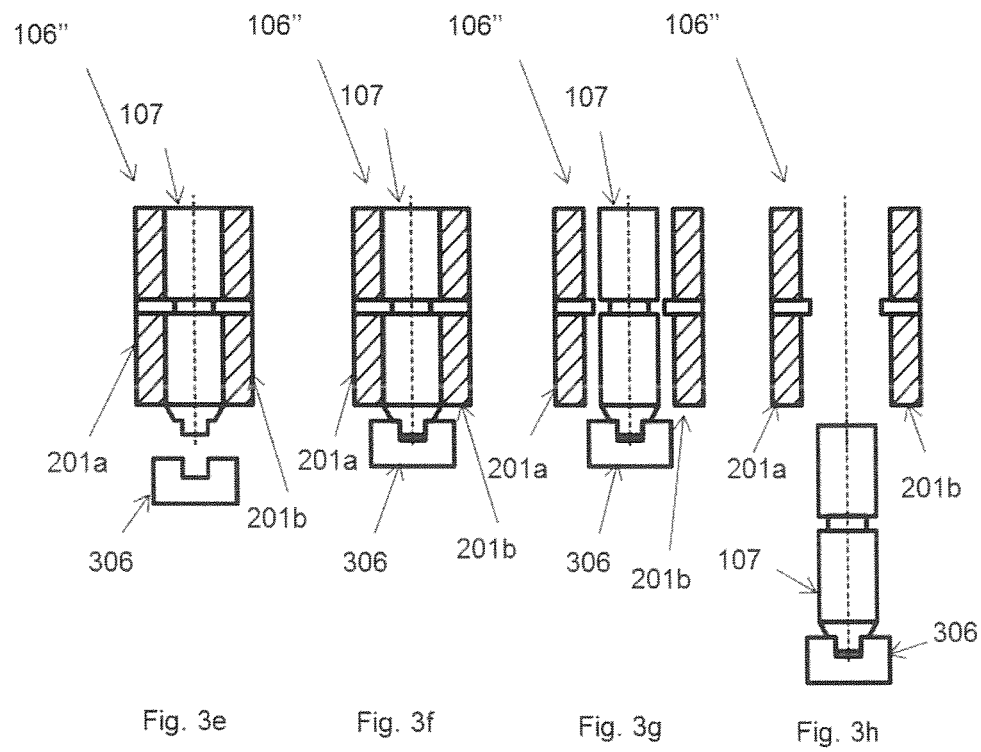
FIGS. 3e-3i show another alternative embodiment of the heat exchanging means.

In FIG. 3e, the heat exchanging sections 201a, 201b hold the feedstock liquefying unit 107. A receptacle 306, which can be part of a feedstock liquefying unit storage, is present to receive the feedstock liquefying unit 107.

In FIG. 3f, the receptacle 306 and the feedstock liquefying unit 107 are brought into contact.

In FIG. 3g, the heat exchanging sections 201a, 201b are laterally translated to bring the heat exchanging means 106" in an open state, thereby releasing the feedstock liquefying unit 107.

In FIG. 3h, the heat exchanging means 106" and receptacle are separated to remove the feedstock liquefying unit 107 from the heat exchanging means 106".

Figure 3I:
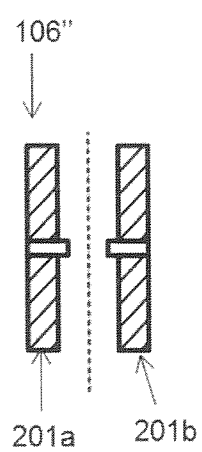

In FIG. 3i, the heat exchanging means 106" is ready to receive a replacement feedstock liquefying unit (not shown).

Figure 4:
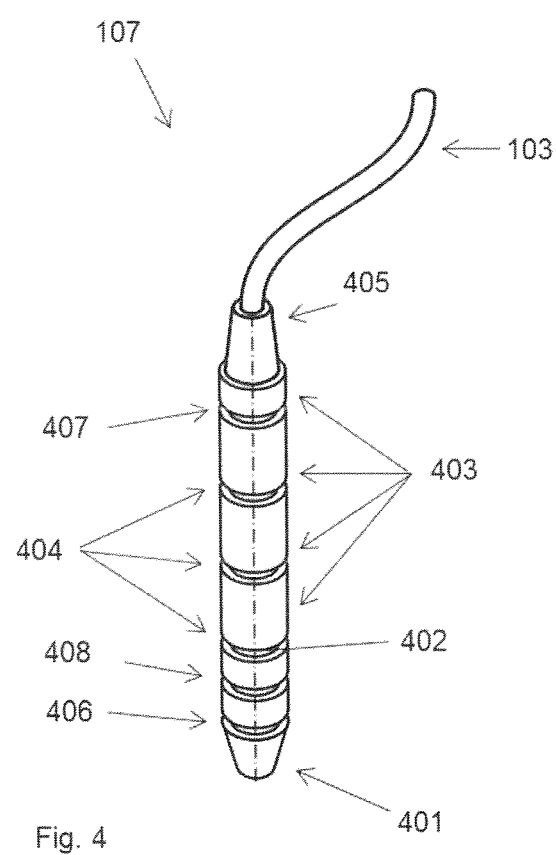
FIG. 4 shows a feedstock liquefier unit according to an embodiment of the invention.

In FIG. 4 an example of the feedstock liquefying unit 107 is shown. In this example, the feedstock liquefying unit 107 comprises a thermally conductive tube 402 that can comprise at least one of a metal, a thermally conductive polymer composition and a ceramic material. The thermally conductive tube 402 is provided with a feedstock supply channel inside, a nozzle 401 for releasing molten feedstock onto at least one of the build plate 104 and the object 108 to be created, and a feedstock supply 103 connected to the feedstock supply channel by means of cuff 405, opposite to the nozzle 401. The thermally conductive tube 402 may be provided with heat conductive sections 403. Each heat conductive section may be formed by a thickened portion of the thermally conductive tube 402. Alternatively, each heat conductive section 403 comprises a concentric ring of highly heat conductive material such as a highly heat conductive metal.

Interface surfaces of the heat conductive sections 403 can mechanically and thermally interface with heat exchanging sections 201a, 201b. There can be multiple heat conductive sections 403 distributed along the thermally conductive tube 402 in an axial direction. The thermal interface surfaces of the heat conductive sections 403 are thermally conductive in radial and tangential direction relative to the thermal conductivity in axial direction, which is suppressed by grooves 404. Groove 408 provides a vertical reference to a corresponding rim in the printhead 102. Grooves 404 may be used to align the feedstock liquefying unit 107 with the feedstock liquefying unit storage 105. Moreover, grooves 404 may serve as thermal insulators between individual heat conductive sections 403. In this way thermal crosstalk can be prevented. In addition, the grooves 404 may also be used as vertical position references like groove 408 if thermal insulation is warranted. Groove 406 and groove 407 can be used to interface the feedstock liquefying unit 107 with the feedstock liquefying unit storage 105.

The feedstock supply 103 may in this example be formed by a filament guide which guides AM feedstock in the form of filament from a filament feedstock storage to the feedstock liquefying unit 107. The feedstock supply may alternatively be arranged at or on the printhead 102. The feedstock supply 103 may be mounted for example to the sub frame 301. The feedstock supply 103 can in this case be releasably connected to the feedstock liquefying unit 107, to the opening of the supply channel at the end opposite of the nozzle 401. This allows the feedstock AM material to be supplied in different forms, such as filament, rods, granules, particles, or any form.

The feedstock supply 103 may comprise a drive, wherein the drive is connected to the printhead assembly, and wherein the feedstock supply 103 is connected to the printhead assembly via the drive.

Preferably, the drive is located close to the printhead, which overcomes delay, resiliency or latency in the feedstock supply and thereby improves accurate control of the feeding of the feedstock into the liquefying unit.

When the feedstock liquefying unit 107 is mounted in the printhead 102, groove 406 is situated below the printhead 102 and groove 407 above, to make them accessible by the feedstock liquefying unit storage 105.

Different feedstock liquefying units 107 can have different nozzle properties, such as exit opening diameters, materials, thermal properties and lengths, adapted for different AM feedstock materials. When switching between feedstock liquefying units with different AM feedstock materials, the temperature settings of each section of the printhead 102 may have to be adapted to the new AM feedstock. To minimize the exchange time, it is important to keep the thermal time constant low so that the heating up of the new feedstock liquefying unit is as fast as possible.

Figure 5:
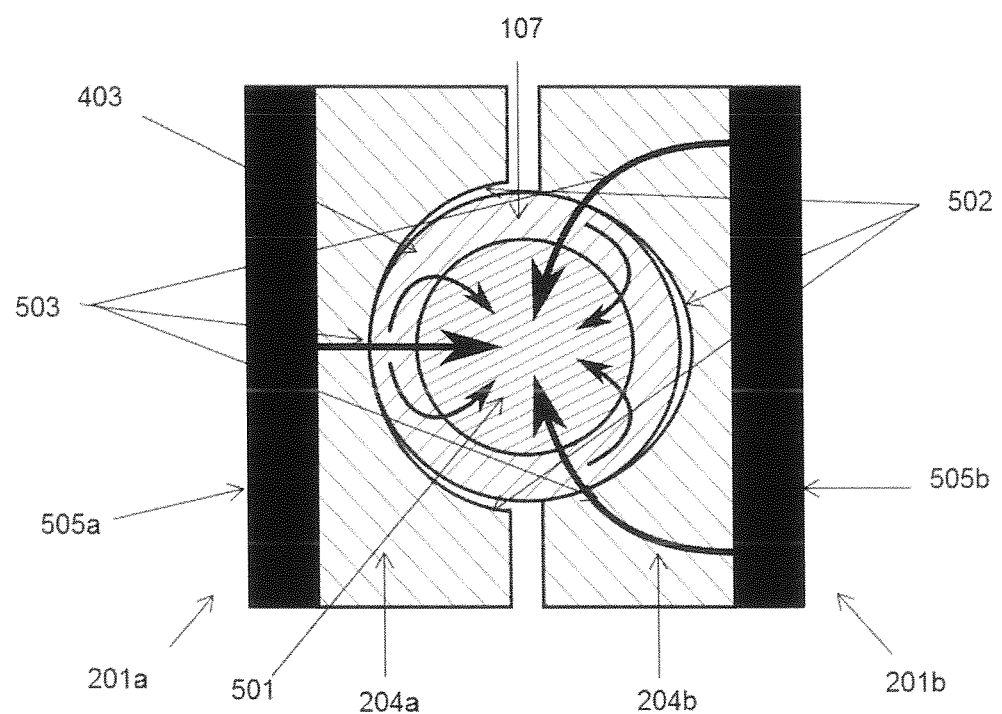
FIG. 5 shows a cross section of the feedstock liquefier unit accommodated in a heat exchanging means according to an embodiment of the invention.

In FIG. 5 a cross section of a feedstock liquefying unit 107 is shown clamped between heat exchanging sections 201a, 201b. In this example, the heat exchanging sections 201a, 201b are provided with heaters 505a, 505b respectively which generate the heat required for heating the feedstock liquefying unit 107 and the AM feedstock material 501 therein. The heaters 505a, 505b can be electrical resistors. Heat conductive elements 204a, 204b conduct the heat generated in the heaters 505a, 505b of heat exchanging sections 201a, 201b to the feedstock liquefying unit 107.

In this example, due to production tolerances and wear, the inner radius of heat conducting element 204a may be slightly larger than the outside radius of feedstock liquefying unit 107, while the inner radius of heat conductive element 204b may be slightly too small. As a consequence, air gaps 502 occur between the heat conductive elements 204a, 204b and the feedstock liquefying unit 107.

Primary thermal paths 503 transfer the heat from the heat conductive elements 204a, 204b to the feedstock liquefying unit 107 where there is physical contact between the heat conductors inner surface and the feedstock liquefying unit outer surface. Secondary paths may be defined by heat transfer via the air gaps 502. The primary thermal paths 503 however have better thermal conductivity than the thermal paths through the airgaps 502 since heat resistance within the air gaps 502 is much greater than the heat resistance of the primary thermal paths 503.

The uneven distribution of heat from the heat conductive elements 204a, 204b in this example may result in local hotspots in the feedstock material 501, which may have a negative effect on material properties of the object 108 to be printed.

The feedstock liquefying unit 107 is therefore designed with sufficient tangential thermal conductivity. This can be accomplished by choosing sufficient wall thickness and a material with sufficient thermal conductivity. This can be further achieved by the heat conductive section 403, which evenly redistributes heat transferred from the heat conductive elements 204a, 204b across a circumference of the feedstock liquefying unit 107.

Figure 6:
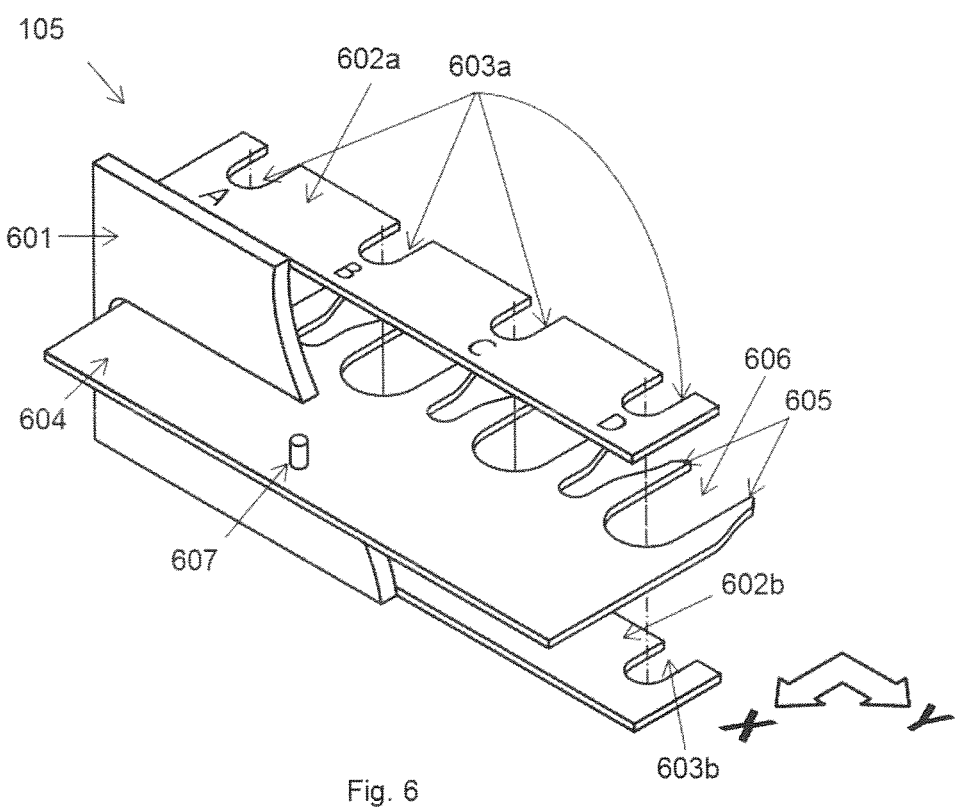
FIG. 6 shows a feedstock liquefier unit storage according to an embodiment of the invention.

In FIG. 6 an exemplary feedstock liquefying unit storage 105 is shown. The feedstock liquefying unit storage 105 has a top rack 602a and a bottom rack 602b which are fixed to a frame 601. The frame can be formed by an inside wall of a print chamber wherein the object 108 is to be printed. Top rack 602a has slots 603a which can interface with grooves 407 of the feedstock liquefying units 107. Slots 603b of bottom rack 602b can interface with grooves 406 of the feedstock liquefying units 107. In this example, the slots 603a are marked A to D, but any number of slots can be present.

In between the top rack 602a and the bottom rack 602b an actuator cam 604 is provided which can move in an X direction as indicated in FIG. 6. The actuator cam 604 can be moved by an actuator via for example engagement point 607. Various alternative ways of actuating the cam 604 will be available to the skilled person. The actuator cam 604 is provided with cam teeth 605 having outer surfaces that can engage with engagement points 203a, 203b of the heat exchanging sections 201a, 201b respectively to open the heat exchanging means 106 of printhead 102.

The opening is performed by aligning the printhead 102 using the positioning system 101 with positions 606 of the actuator cam 604 so that the engagement points 203a, 203b align with the outer surface of teeth 605. By moving the cam 604 and the heat exchanging means 106 towards each other, the engagement points 203a, 203b are pushed aside, thereby causing the feedstock liquefying unit 107 held within the heat exchanging means 106 to be released.

The feedstock liquefying unit 107 may subsequently be disposed in one of the slots 603a, 603b of the corresponding top rack 602a and bottom rack 602b. Likewise, a replacement feedstock liquefying unit 107 may be obtained from the feedstock liquefying unit storage 105, by actuating the positioning system 101 and the actuator cam 604 in reverse directions and in a reverse order.

The feedstock liquefying unit storage 105 may be further provided with auxiliary holding means such as clamps, notches and latches for securing the feedstock liquefying units 107 in the slots 603a, 603b. The feedstock liquefying unit storage 105 may be further provided with temperature controlling means such as heaters, coolers, sensors and regulators for controlling a temperature of one or more stored feedstock liquefying units. This allows a preheated replacement feedstock liquefying unit to be loaded into the heat exchanging means 106 of the print head 102 and be utilized instantly.

A process for disposing the feedstock liquefying unit 107 in the feedstock liquefying unit storage 105 and obtaining the replacement feedstock liquefying unit from the feedstock liquefying unit storage 105 will be further elucidated with reference to FIGS. 7a-7h. It is noted that in FIGS. 7a-7h, for the sake of clarity, only the heat exchanging means 106 of the printhead assembly 102 with or without feedstock liquefying unit is shown. Furthermore, the example is described using Carthesian coordinates (X,Y,Z). It will be clear that different coordinate systems, e.g. spherical coordinates, can also be used. Moreover, the feedstock liquefying units A-D are stored in corresponding slots A-D of the feedstock liquefying unit storage 105 to prevent twisting and entanglement between filament guides in the case that feedstock material in filament form is used.

Figure 7A:
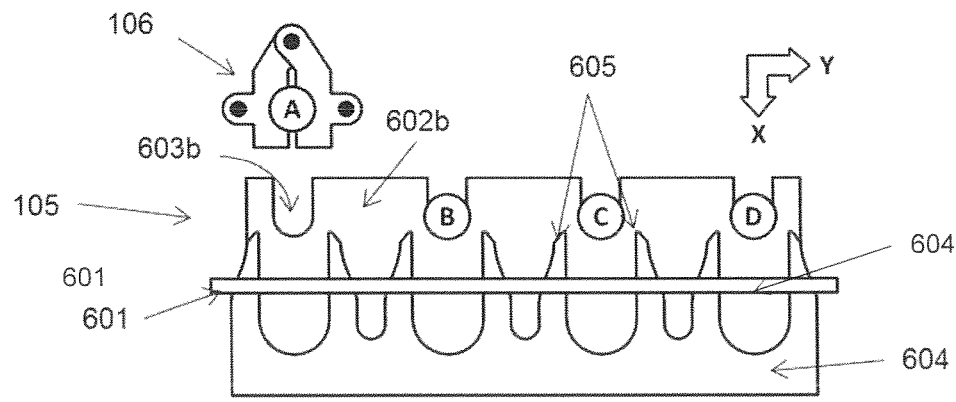
FIGS. 7a-7h show a process for disposing and obtaining of a feedstock liquefier unit in a feedstock liquefier unit storage according to an embodiment of the invention.

In FIG. 7a, the printhead has stopped printing with feedstock liquefying unit A and moves towards location A of feedstock liquefying unit storage 105.

Figure 7B:
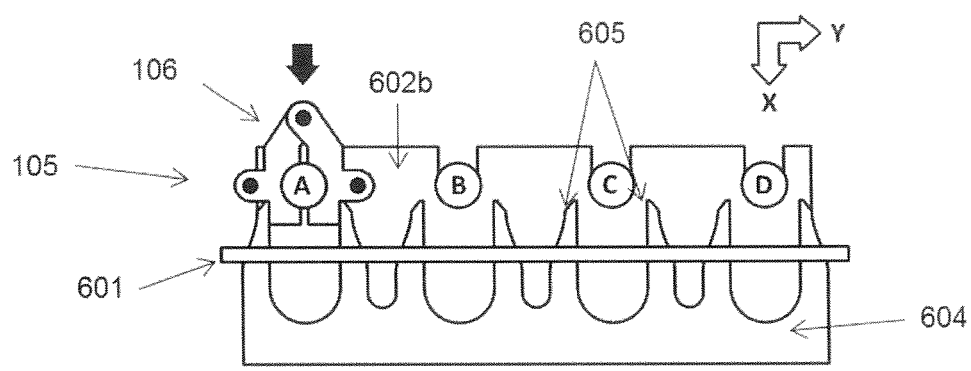

In FIG. 7b, the printhead moves inside slot A of the feedstock liquefying unit storage 105 in positive X direction (indicated by the black arrow). Actuator cam 604 is still retracted so the heat exchanging means 106 remains in a closed state as it enters the feedstock liquefying unit storage 105. Groove 407 of the feedstock liquefying unit 107 aligns with slot 603a on position A of the top rack 602a and groove 406 aligns with groove 603b of bottom rack 602b of feedstock liquefying unit storage 105.

Figure 7C:
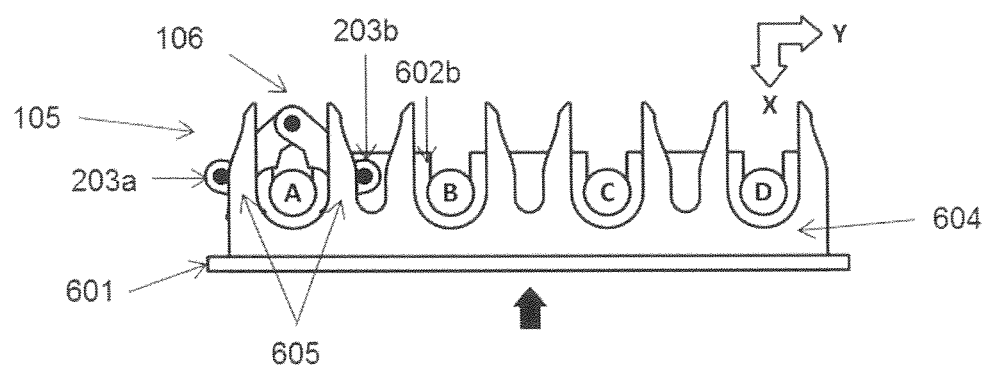

In FIG. 7c, after the printhead has moved inside slot A, the actuator cam 604 moves in negative X direction (indicated by the black arrow) towards the heat exchanging means 106. Outer surfaces of teeth 605 engage with engagement points 203a, 203b of the heat exchanging means 106, thus opening the heat exchanging means 106 and releasing feedstock liquefying unit A. In an alternative, non-limiting embodiment of the invention, the teeth 605 of the actuator cam 604 can engage with the engagement points 203a, 203b of the heat exchanging means 106 while moving the printhead inside slot A thus bringing the heat exchanging means in the open state. The skilled person will know of means, such as a clamping spring or a latch, to prevent a premature release of the feedstock liquefying unit from the heat exchanging means 106.

Figure 7D:
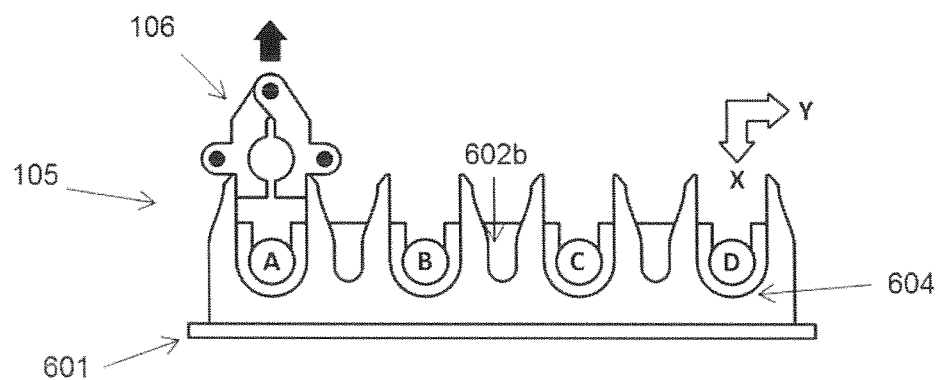

In FIG. 7d, the printhead moves away from feedstock liquefying unit storage 105 (indicated by the black arrow). As engagement points 203a, 203b move along the outer surfaces of teeth 605 of the actuator cam 604, the heat exchanging means 106 closes because of the force exerted by spring 303.

Figure 7E:
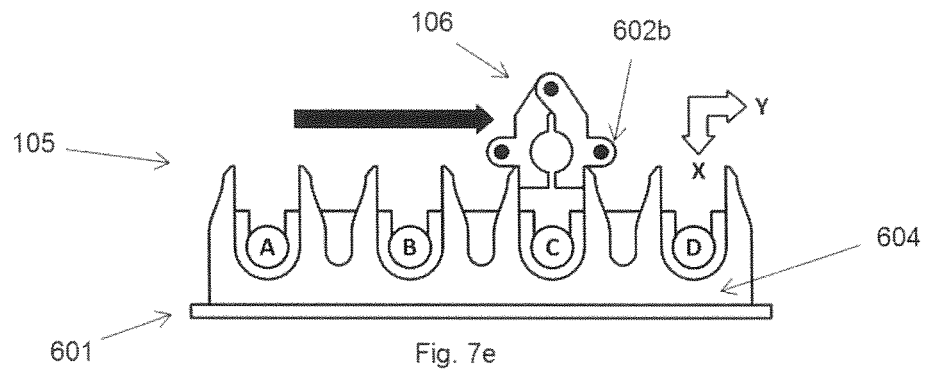

In FIG. 7e, the printhead moves in Y-direction (indicated by the black arrow) to slot C of feedstock liquefying unit storage 105.

Figure 7F:
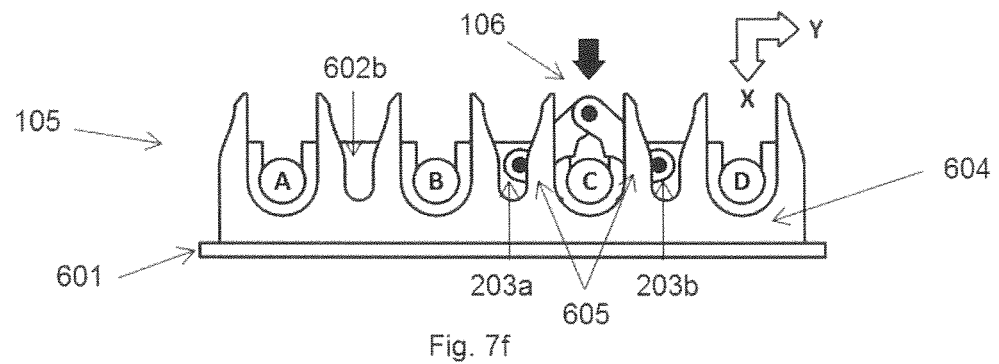

In FIG. 7f, the printhead moves in X-direction (indicated by the black arrow) towards feedstock liquefying unit C. Engagement points 203a, 203b engage with outer surfaces of teeth 605 on the actuator cam 604, thus opening the heat exchanging means 106. The heat exchanging means 106 can envelop replacement feedstock liquefying unit C.

Figure 7G:
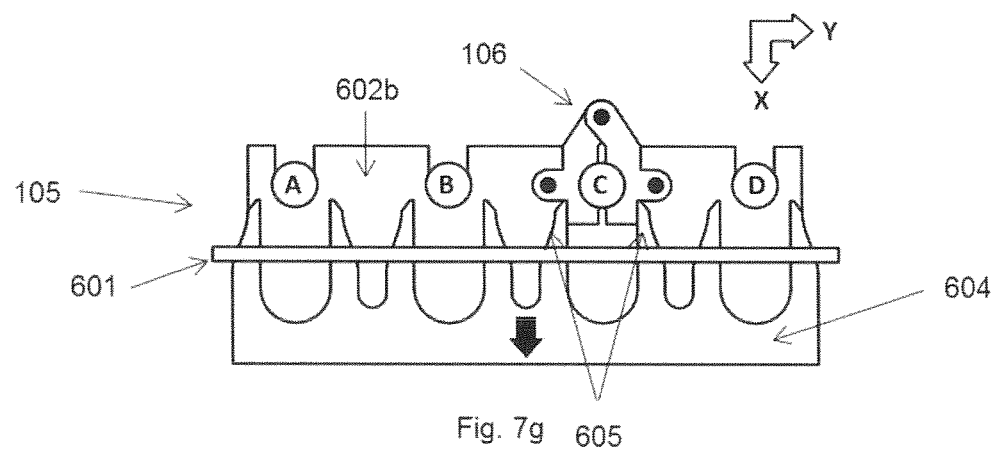

In FIG. 7g, actuator cam 604 is retracted (indicated by the black arrow) so heat exchanging sections 201a, 201b of the heat exchanging means 106 close and inner surfaces of the heat conductive elements 204a, 204b engage with surfaces of the heat conductive sections 403 of replacement feedstock liquefying unit C.

Figure 7H:
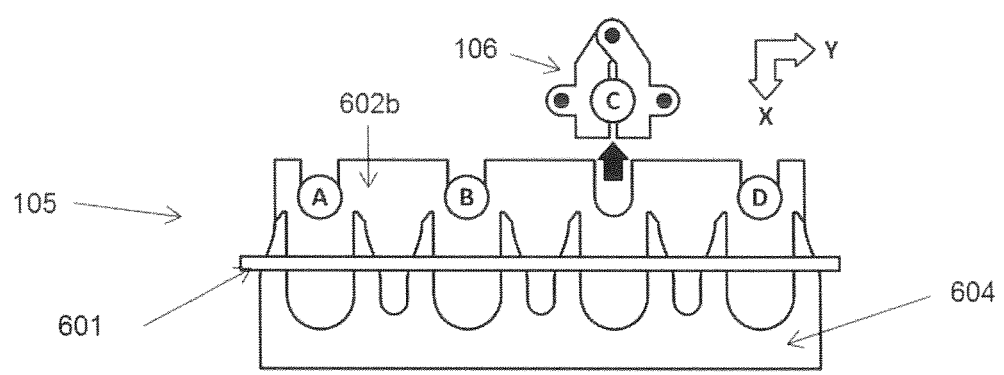

In FIG. 7h, after the heat exchanging means has assumed the closed state, the printhead moves away (indicated by the black arrow) from the feedstock liquefying unit storage 105 and printing can commence with replacement feedstock liquefying unit C. In an alternative, non-limiting embodiment of the invention, the teeth 605 of the actuator cam 604 can disengage from the engagement points 203a, 203b of the heat exchanging means 106 while moving the printhead out of slot A thus bringing the heat exchanging means in the closed state. The skilled person will know of means, such as a clamping spring or a latch, to prevent the feedstock liquefying unit to fall out of the heat exchanging means while moving the printhead away from the feedstock liquefying unit storage 105.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

| REFERENCE NUMERALS | |
|---|---|
| 100 | System for additive manufacturing |
| 101 | Positioning system |
| 102 | Printhead assembly |
| 103 | Feedstock supply |
| 104 | Build plate |
| 105 | Feedstock liquefying unit storage |
| 106, 106', 106" | Heat exchanging means |
| 107 | Feedstock liquefying unit |
| 108 | Object to be printed |
| 201a, 201b | Heat exchanging sections |
| 202 | Hinge |
| 203a, 203b | Engagement points |
| 204a, 204b | Heat conductive elements |
| 205 | Feedstock liquefying unit recess |
| 206a, 206b | Curved inner surface |
| 301 | Printhead sub frame |
| 302 | Reference point |
| 303 | Spring |
| 304 | Lever |
| 305 | Spring |
| 306 | Receptacle |
| 401 | Nozzle |
| 402 | Thermally conductive tube |
| 403 | Heat conductive section |
| 404 | Groove |
| 405 | Cuff |
| 406 | Groove |
| 407 | Groove |
| 408 | Groove |
| 501 | AM feedstock |
| 502 | Air gap |
| 503 | Primary thermal path |
| 504 | Heat distribution |
| 505a, 505b | Heaters |

-continued

| REFERENCE NUMERALS | |
|---|---|
| 601 | Frame |
| 602a | Top rack |
| 602b | Bottom rack |
| 603a | Slots of top rack |
| 603b | Slots of bottom rack |
| 604 | Actuator cam |
| 605 | Teeth |
| 606 | Recess |
| 607 | Engagement point |

What is claimed is:

1. A printhead assembly for a system for additive manufacturing, AM, wherein the printhead assembly comprises
heat exchanging means attached to the printhead assembly, wherein the heat exchanging means are configured and arranged to establish a releasable clamping connection with a feedstock liquefying unit that is configured to liquefy AM feedstock to accommodate the feedstock liquefying unit in the printhead assembly; wherein
the heat exchanging means are actuatable for bringing the heat exchanging means to an open state, to allow at least one of disposal of the feedstock liquefying unit and acquisition of a replacement feedstock liquefying unit, and for bringing the heat exchanging means to a closed state, to hold the feedstock liquefying unit,
wherein the heat exchanging means comprises a first heat exchanging section and at least one of a second heat exchanging section and a support structure, wherein the support structure is associated with the printhead assembly, wherein
the first heat exchanging section and at least one of the second heat exchanging section and the support structure are movable relative to one another; and
wherein
at least one of the first heat exchanging section, the second heat exchanging section and the support structure is actuatable to bring the heat exchanging means to said open state, and wherein
at least one of the first heat exchanging section, the second heat exchanging section and the support structure is actuatable to bring the heat exchanging means to said closed state; and
wherein at least one of the first heat exchanging section and the second heat exchanging section and the support structure is provided with first actuating means, and wherein the first actuating means are arranged to cooperate with a second actuating means of a feedstock liquefying unit storage and a positioning system of an AM system to enable the heat exchanging means to assume said open state upon engagement of the first actuating means and the second actuating means, and to assume said closed state upon disengagement of the first actuating means and the second actuating means.

2. The printhead assembly according to claim 1, wherein at least one of the first heat exchanging section, the second heat exchanging section and the support structure is associated with the printhead assembly using a pivotal hinge.

3. The printhead assembly according to claim 1, wherein at least one of the first heat exchanging section, the second heat exchanging section and the support structure is associated with the printhead assembly using a slidable arrangement.

4. The printhead assembly according to claim 1, wherein the printhead assembly further comprises a reference element for providing a reference position to the at least one first heat exchanging section.

5. The printhead assembly according to claim 1, wherein the heat exchanging means are provided with a recess that is arranged to accommodate a feedstock liquefying unit, the heat exchanging means being arranged to release and acquire the feedstock liquefying unit in at least one of a direction transverse to an axial center line of the recess, and in a direction parallel to the axial center line of the recess.

6. The printhead assembly according to claim 5, wherein at least one of the first heat exchanging section and the second heat exchanging section and the support structure is provided with at least one heat conductive element.

7. The printhead assembly according to claim 6, wherein said at least one heat conductive element has a recessed shape corresponding to an outer circumference of the feedstock liquefying unit for close fittingly accommodating the feedstock liquefying unit.

8. The printhead assembly according to claim 1, further comprising a feedstock liquefying unit, wherein said feedstock liquefying unit comprises a nozzle for depositing liquefied AM feedstock onto at least one of a build plate and an object to be created, the feedstock liquefying unit having a supply opening and a supply channel from the supply opening to the nozzle.

9. The printhead assembly according to claim 8, wherein the feedstock liquefying unit comprises a thermally conductive tube which is attached to the nozzle, wherein the supply channel is accommodated within the thermally conductive tube, and the supply opening is formed by an end part of the thermally conductive tube that is arranged opposite of the nozzle.

10. The printhead assembly according to claim 9, wherein the thermally conductive tube is provided with at least one concentric heat conductive section.

11. A system for additive manufacturing (AM), comprising
a build plate for positioning an object to be created;
at least one printhead assembly according to claim 1;
a feedstock liquefying unit accommodated in said at least one printhead assembly;
feedstock supply means, arranged for feeding the feedstock into the feedstock liquefying unit;
a positioning system associated with at least one of the printhead assembly and the build plate, arranged for relative spatial positioning of the printhead assembly and the build plate;
a feedstock liquefying unit storage, comprising holding means for accommodating at least one feedstock liquefying unit;
a controller arranged for
controlling the positioning system for disposing the feedstock liquefying unit in a feedstock liquefying unit storage; and
controlling the positioning system for acquiring a replacement feedstock liquefying unit from the feedstock liquefying unit storage.

12. A system according to claim 11, wherein the feedstock liquefying unit storage is provided with first actuating means; at least one of the first heat exchanging section, the second heat exchanging section and the support structure is provided with second actuating means; and wherein the first actuating means being arranged to cooperate with the second actuating means.

13. A system according to claim 11, wherein the feedstock liquefying unit storage is provided with at least one docking position (A) for accommodating the feedstock liquefying unit.

14. A system according to claim 11, wherein the controller that is arranged to control the positioning system for disposing the feedstock liquefying unit in the feedstock liquefying unit storage is configured to:
- control the positioning system for moving the printhead assembly to an unoccupied docking position (A);
- enable engagement of a second actuating means and a first actuating means to move the heat exchanging means to the open state; and
- dispose the feedstock liquefying unit in the unoccupied docking position (A).

15. A system according to claim 14, wherein the controller that is arranged to control the positioning system for acquiring a replacement feedstock liquefying unit from the feedstock liquefying unit storage is configured to:
- control the positioning system for moving the printhead to an occupied docking position (C);
- enable engagement of the second actuating means and the first actuating means to move the heat exchanging means to the open state, and envelop the replacement feedstock liquefying unit in the occupied docking position (C);
- control the positioning system for retracting the printhead from the occupied docking position (C); and
- before retracting the printhead from the occupied docking position (C), enable engagement of the second actuating means and the first actuating means to move the heat exchanging means to the closed state.

16. A system according to claim 11, wherein the feedstock supply means is connected to the supply opening of the feedstock liquefying unit.

17. A system according to claim 11, wherein the feedstock supply means is connected to the printhead assembly and wherein the feedstock supply means further comprise a detachable passage for detachably connecting the feedstock supply means to the feedstock liquefying unit.

* * * * *